(12) United States Patent
Cho et al.

(10) Patent No.: US 8,624,553 B2
(45) Date of Patent: Jan. 7, 2014

(54) BATTERY TEMPERATURE ADJUSTING SYSTEM AND OPERATING METHOD THEREOF

(71) Applicant: LG Chem, Ltd., Seoul (KR)

(72) Inventors: Seung Su Cho, Daejeon (KR); Seung Don Choi, Daejeon (KR); Dae Sik Choi, Daejeon (KR); Chang Moon Jeong, Cheongju-si (KR); Hong Sin Kim, Daejeon (KR); You Rim Yoon, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 13/740,894

(22) Filed: Jan. 14, 2013

(65) Prior Publication Data
US 2013/0127420 A1    May 23, 2013

Related U.S. Application Data

(63) Continuation of application No. PCT/KR2012/005623, filed on Jul. 13, 2012.

(30) Foreign Application Priority Data

Jul. 14, 2011  (KR) .................. 10-2011-0069847

(51) Int. Cl.
  *H01M 10/44* (2006.01)
  *H01M 10/46* (2006.01)
(52) U.S. Cl.
  USPC ....................................................... 320/112
(58) Field of Classification Search
  USPC ............... 320/107, 112, 114, 128, 150, 153; 219/635, 600, 605
  See application file for complete search history.

(56) References Cited

U.S. PATENT DOCUMENTS

| | | | |
|---|---|---|---|
| 6,340,879 | B1 | 1/2002 | Blacker |
| 2008/0143214 | A1* | 6/2008 | McNamara et al. ......... 310/318 |
| 2011/0220634 | A1* | 9/2011 | Yeh ............................. 219/482 |

FOREIGN PATENT DOCUMENTS

| | | |
|---|---|---|
| JP | 2000-228231 A | 8/2000 |
| JP | 2004-311290 A | 11/2004 |
| KR | 10-2010-0090009 A | 8/2010 |

OTHER PUBLICATIONS

International Search Report, dated Jan. 31, 2013, for International Application No. PCT/KR2012/005623, including English translation.

* cited by examiner

*Primary Examiner* — Edward Tso
(74) *Attorney, Agent, or Firm* — Birch, Stewart, Kolasch & Birch, LLP

(57) ABSTRACT

The present invention relates to a battery temperature adjusting system including: a battery unit having a heating pad; a leading wire connected to the battery unit; and a current induction unit surrounding the leading wire, wherein the current induction unit is electrically connected to the heating pad. The battery temperature adjusting system according to the present invention generates the induced current by applying the current induction unit surrounding the leading wire connected to the battery unit, and increases the temperature of the battery unit by supplying the induced current to the heating pad, thereby obtaining a desired battery output in a low-temperature region even without the use of an external power source.

15 Claims, 2 Drawing Sheets

BATTERY TEMPERATURE ADJUSTING SYSTEM AND OPERATING METHOD THEREOF

CROSS-REFERENCE TO RELATED APPLICATIONS

This application is a continuation of International Application No. PCT/KR2012/005623 filed on Jul. 13, 2012, which claims priority from Korean Patent Application No. 10-2011-0069847 filed with Korean Intellectual Property Office on Jul. 14, 2011, the entire contents of which are incorporated herein by reference.

BACKGROUND OF THE INVENTION

The present invention disclosed herein relates to a battery temperature adjusting system, and an operating method thereof.

Typically, as the temperature of a battery used for hybrid vehicles, electric vehicles, and the like decreases, the internal resistance of the battery increases sharply and the capacity of the battery thus decreases to reduce output power, and particularly the capacity of the battery at a low temperature of 0° C. or less decreases to less than half of the capacity at room temperature.

To improve such limitations, a method for raising the temperature of a battery using power of the battery itself has been typically used. However, the typical method consumes energy other than car driving, thereby pausing the output of the battery to be lowered overall. That is, since the energy needed to raise the temperature of the battery is supplied from the battery itself, the energy for car driving is additionally consumed.

Therefore, there is a demand for a study on a method for raising the temperature of a battery while not reducing the output power of the battery even without extra power supply.

SUMMARY OF THE INVENTION

The present invention provides a battery temperature adjusting system and an operating method thereof, the battery temperature adjusting system including: a battery unit having a heating pad; a leading wire connected to the battery unit; and a current induction unit surrounding the leading wire, wherein the current induction unit is electrically connected to the heating pad.

However, the object of the present invention is not limited to the aforesaid, but other objects not described herein will be clearly understood by those skilled in the art from descriptions below.

Embodiments of the present invention provide battery temperature adjusting systems including: a battery unit including a heating pad; a leading wire connected to the battery unit; and a current induction unit surrounding the leading wire, wherein the current induction unit is electrically connected to the heating pad.

In some embodiments, the battery temperature adjusting system may include: a motor unit: a battery unit including a heating pad; a leading wire connecting the motor unit and the battery unit; and a current induction unit surrounding the leading wire, wherein the current induction unit is electrically connected to the heating pad.

In other embodiments, the battery unit may include a plurality of cells and a plurality of heating pads.

In still other embodiments, the cell may be a lithium secondary battery.

In even other embodiments, the battery unit may be used as at least one power source for a middle- or large-sized device from among an electrically driven vehicle including an electric vehicle (EV), a hybrid electric vehicle (HEV) and a plug-in hybrid electric vehicle (PHEV); an electric truck; an electric commercial vehicle; and a power storage system.

In yet other embodiments, the heating pad may include a heating wire.

In further embodiments, the current induction unit may include a solenoid coil.

In still further embodiments, the solenoid coil may be made of metal or metal alloy having a conductivity of $5.80 \times 10^6$ mhos/m or more.

In even further embodiments, the system may further include a control unit for controlling the temperature of the battery unit.

In yet further embodiments, the control unit may be a solid state relay switch unit.

In other embodiments, the system may further include a device for increasing the temperature of the battery unit by using power of the battery itself.

In still other embodiments, the system may further include a device for increasing the temperature of the battery unit by using an extra power source In even other embodiments of the present invention, methods for operating a battery temperature adjusting system include: (a) charging and discharging a battery unit by generating a current in a leading wire connected to the battery unit, and generating a magnetic force around the leading wire; (b) generating an induced current in a current induction unit surrounding the leading wire through the magnetic force generated in operation (a); and (c) supplying the induced current generated in operation (b).

In yet other embodiments, the method may include: (a) charging and discharging the battery unit by generating an electric current in the leading wire connecting a motor unit and the battery unit having the heating pad, and generating a magnetic force around the leading wire; (b) generating an induced current inside the current induction unit which surrounds the leading wire through the magnetic force generated in operation (a); and supplying the induced current generated in operation (b) to the heating pad In further embodiments, the method may further include cutting off the induced current supplied in operation (c) when the temperature of the battery unit is increased over a reference temperature.

A battery temperature adjusting system according to the present invention generates an induced current by applying a current induction unit surrounding a leading wire (specifically, a leading wire connecting a motor unit and a battery unit) connected to a battery unit, and supplies the induced current to a heating pad to raise the temperature, thereby obtaining a desired battery output in a low-temperature region even without an external power source.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION OF PREFERRED EMBODIMENTS

Hitherto, there has never been found an application example of a battery temperature adjusting system by applying a current induction unit surrounding a leading wire connected to a battery unit to generate an induced current. Thus, the present inventors confirmed that a desired battery output could be obtained in a low-temperature region by raising the temperature of a battery even without an external power source in the middle of researches on a battery temperature adjusting system, and have finally completed the present invention.

The present invention will be described in detail below.

The present invention provides a battery temperature adjusting system, the system including: a battery unit having a heating pad; a leading wire connected to the battery unit; and a current induction unit surrounding the leading wire, wherein the current induction unit is electrically connected to the heating pad.

Specifically, the present invention provides a battery temperature adjusting system which includes: a motor unit: a battery unit having a heating pad; a leading wire connecting the motor unit and the battery unit; and a current induction unit surrounding the leading wire, wherein the current induction unit is electrically connected to the heating pad.

Embodiments of the present invention will be described below in more detail with reference to the accompanying drawings.

Specific embodiments of the present invention will be exemplarily illustrated while various modifications and variations are possible, which will be described in detail below. However, it is not intended to delimit the present invention to special forms disclosed herein; rather it is intended that the present invention covers modifications, equivalents, and replacements which fall within the idea of the present invention defined by the appended claims.

Figure 1:
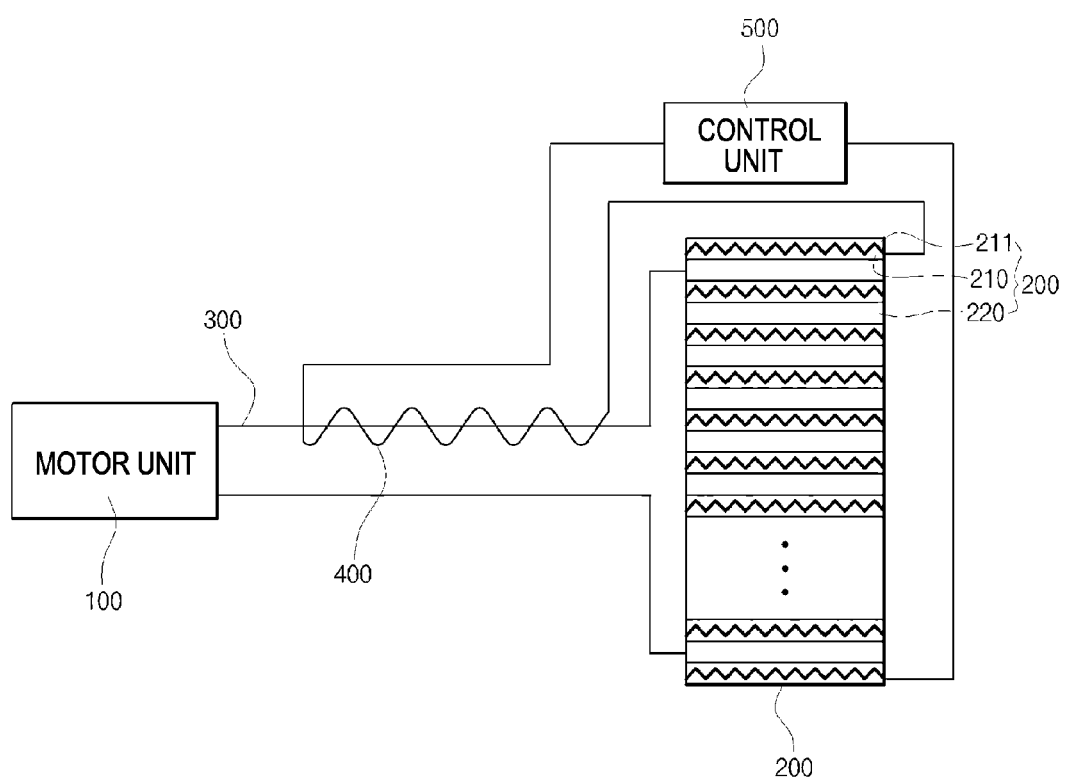
FIG. 1 is a schematic view illustrating a battery temperature adjusting system according to an embodiment of the present invention.
Figure 2:
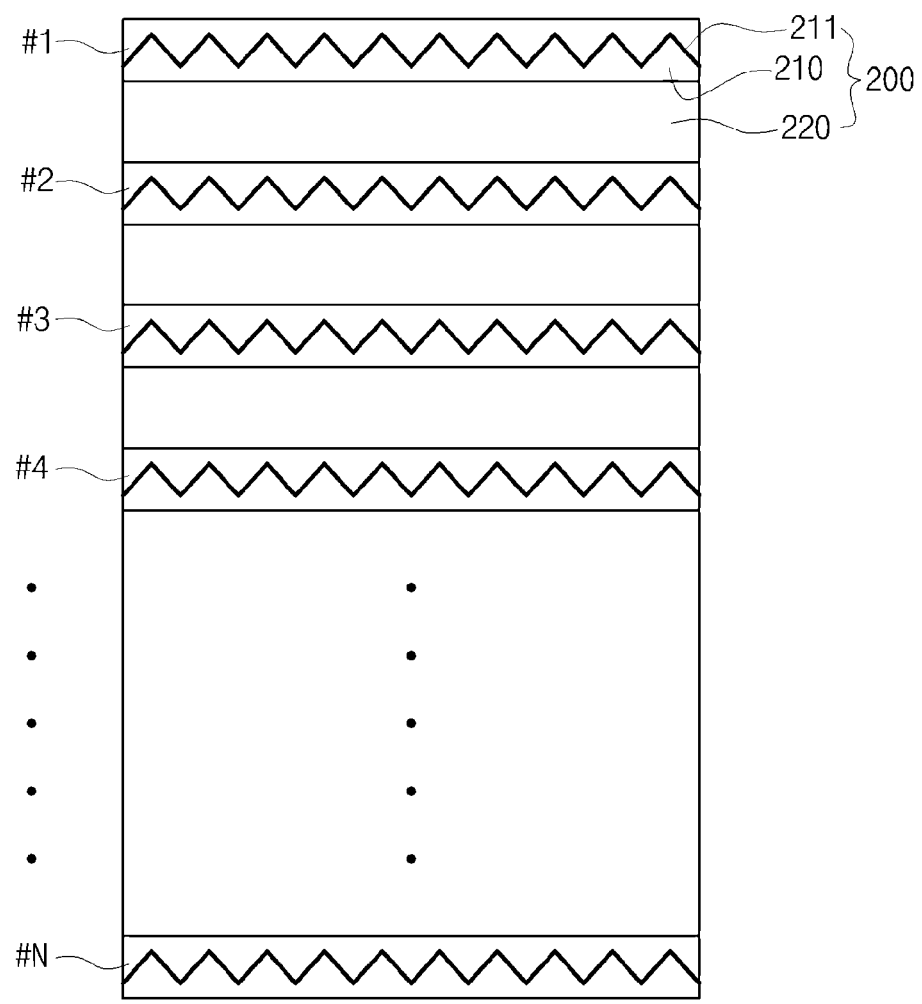
FIG. 2 is a schematic view illustrating a battery unit including a heating pad according to an embodiment of the present invention.

FIG. 1 is a schematic view illustrating a battery temperature adjusting system according to an embodiment of the present invention, and FIG. 2 is a schematic view illustrating a battery unit including a heating pad according to an embodiment of the present invention.

As illustrated in FIG. 1, the battery temperature adjusting system according to an embodiment of the present invention includes a motor unit 100, a battery unit 200 having a heating pad 210, a leading wire 300 connecting the motor unit 100 and cells 220 of the battery unit 200; and a current induction unit 400 surrounding the leading wire 300, wherein the current induction unit 400 is electrically connected to the heating pad 210.

As illustrated in FIG. 2, the battery unit 200 may include a plurality of cells 220 and a plurality of heating pads 210, and, more desirably, the battery unit 200 may include a plurality cells 220 connected to each other and a plurality of heating pads 210 disposed between the respective cells 220. However, the present invention is not limited thereto. The heating pad 210 may include a heating wire 221.

The motor unit 100 receives electric energy from the battery unit 200 to transform the electric energy into mechanical energy, and may be an AC motor or DC motor. For example, the motor unit 100 may be a device for driving a power tool; an electrically driven vehicle including an electric vehicle (EV), a hybrid electric vehicle (HEV) and a plug-in hybrid electric vehicle (PHEV); an electric truck; an electric commercial vehicle; or a power storage system.

The battery unit 200 supplies energy for driving the motor unit 100, and can keep the temperature constant by including the plurality of cells 220 which are electrically connected, and the heating pads 210 disposed between the respective cells 220. Here, the cell 220 may be preferably a secondary battery which is rechargeable, and more preferably a lithium secondary battery, but is not limited thereto.

Specifically, the heating pad 210 is electrically connected to the current induction unit 400, and connected to the leading wire connected to the current induction unit 400 to receive an induced current from the current induction unit 400. The heating pad 210 may have a structure such that a first heating pad and a second heating pad are disposed in an upper portion and a lower portion, respectively, and the heating wire 221 is disposed between the first and second heating pads. Herein, a contact portion between the heating wire 221 and the leading wire and a leading wire hole are formed between the first and second heating pads, so that the heating pad 210 is connected to the leading wire. In particular, the heating wire 221 is built in the heating pad 210, and functions to raise the temperature of the cell 220 by receiving the induced current generated from the current induction unit 400. A type of the heating wire is not particularly limited, and thus a general heating wire, a silicon heating wire, a carbon heating wire, a specialized carbon heating wire, a non-magnetic heating wire, or the like may be used as the heating wire.

The battery unit may be diversely used as at least one power source for a middle- or large-sized device from among a power tool; an electrically driven vehicle including an electric vehicle (EV), a hybrid electric vehicle (HEV) and a plug-in hybrid electric vehicle (PHEV); an electric truck; an electric commercial vehicle; and a power storage system.

The current induction unit 400 is electrically connected to the heating pad 210, and may be formed to surround the leading wire 300 connecting the motor unit 100 and the battery unit 200 in order to supply an induced current. In an embodiment, the current induction unit 400 may be configured by a solenoid coil which is produced by densely and uniformly winding the leading wire 300 around a cylinder or the like.

Generally, a magnetic field is generated around the leading wire through which an electric current flows. When an electric current flows through the leading wire which is densely and uniformly wound spirally around a cylinder, a magnetic flux outside the cylinder is almost 0, and a magnetic flux inside the cylinder is relatively uniform. Therefore, the solenoid coil is an energy transformer because it transforms electric energy into magnetic energy, and thus becomes an electromagnet which may adjust the intensity of a magnetic field by controlling the intensity of electric current. An induced current generated at this time is affected by inductance which is determined according to materials and types of the solenoid coil, and the inductance is calculated as follow.

$$L = \mu_0 n^2 l A$$

L=inductance
$\mu_0$=permeability in vacuum
n=number of turns per unit length
l=length of solenoid coil
A=sectional area of solenoid coil The solenoid coil is made of metal or metal alloy with excellent electrical conductivity, and may be made of metal or metal alloy having a conductivity of $5.80 \times 10^6$ mhos/m or more. Thus, any metal or metal alloy having a conductivity of $5.80 \times 10^6$ mhos/m or more may be used for the solenoid coil, but, in one specific embodiment of the present invention, the solenoid coil made of copper was used. Particularly, copper has an excellent conductivity of $5.80 \times 10^7$ mhos/m.

Also, the battery temperature adjusting system according to the present invention may further include a control unit 500 for controlling the temperature of the battery unit 200.

The control unit 500 detects the surface temperature of the cell 220 of the battery unit 200 in real time, and thus, if the temperature is greater than a reference temperature, the controller 500 cuts off the induced current, thereby maintaining the temperature of the cell 200 of the battery 200 to a proper temperature. Specifically, the control unit 500 may be a switch unit, and more particularly, the control unit 500 may be a solid state relay switch unit. By using the solid state relay as a switch unit, it is possible to increase a switching service life and perform a switching operation with higher reliability. The reference temperature of the battery unit 200 may be preferably in the range of 20° C. to 30° C., and more preferably room temperature (25° C.), but is not limited thereto. If the temperature of the battery unit 200 is increased beyond the reference temperature, the battery is degraded to have a negative effect. Thus the temperature of the battery unit 200 should be detected in real time to cut off the induced current.

Also, the battery temperature adjusting system according to the present invention may be additionally used together with a typical temperature adjusting device.

As a specific embodiment, the battery temperature adjusting system according to the present invention may further include at least one of a device for raising the temperature of the battery unit by using power of the battery itself, and a device for raising the temperature of the battery unit by using an extra power source.

According to another aspect of the present invention, there is provided a method for operating the battery temperature adjusting system, the method including: (a) charging and discharging the battery by generating a current in a leading wire connected to a battery unit having a heating pad, and generating a magnetic force around the leading wire; (b) generating an induced current inside a current induction unit which surrounds the leading wire through the magnetic force generated in operation (a); and supplying the induced current generated in operation (b) to the heating pad.

Specifically, the present invention provides a method for operating the battery temperature adjusting system, which includes: (a) charging and discharging the battery unit 200 by generating a current in the leading wire 300 connecting the motor unit 100 and the battery unit 200 having the heating pad 210, and generating a magnetic force around the leading wire 300; (b) generating an induced current inside the current induction unit 400 which surrounds the leading wire 300 through the magnetic force generated in operation (a); and supplying the induced current generated in operation (b) to the heating pad 210.

Also, the method for operating the battery temperature adjusting system, according to the present invention, may further include cutting off the induced current supplied in operation (c) when the temperature of the battery unit 200 is increased over the reference temperature.

In the method for operating the battery temperature adjusting system, according to the present invention, an electric current is generated in the leading wire 300 connecting the motor unit 100 and the battery unit 200 through charging and discharging of the battery unit. This leads to the generation of a magnetic force around the leading wire 300 according to the Ampere's right-handed screw rule. The induced current is generated in the current induction unit 400 surrounding the leading wire 300 through the magnetic force. The generated induced current is supplied to the heating pad 210 of the battery unit 200, and then heats the battery unit 200 to raise the temperature. When the temperature is increased over the reference temperature by detecting the temperature of the battery unit 200 in real time, the temperature of the battery unit 200 may be adjusted by cutting off the induced current which is being supplied.

The reference temperature of the battery unit 200 may be preferably in the range of 20° C. to 30° C., and more preferably room temperature (25° C.), but is not limited thereto. If the temperature of the battery unit 200 is increased beyond the reference temperature, the battery is degraded to have a negative effect. Thus the temperature of the battery unit 200 should be detected in real time to cut off the induced current.

As described above, the battery temperature adjusting system according to the present invention generates an induced current by applying the current induction unit 400 surrounding a leading wire connected to the battery unit, for example, the leading wire 300 which connects the motor unit 100 and the battery unit 200, and then supplies the induced current to the heating pad 210 to thereby raise the temperature of the battery unit 200. Thus, it is possible to increase the battery output up to 20% even without the use of an external power source when compared with typical methods for increasing the temperature of the battery using power of the battery itself in a low-temperature region of 0° C. or less.

The foregoing description of the present invention is considered illustrative, and a person skilled in the art to which the present invention pertains would understand that the present invention could be easily modified into other specific embodiments without change in the technical idea and essential features of the present invention. Therefore, the above-described embodiments are illustrative in all the aspects, and should be construed as not being limitative.

What is claimed is:

1. A battery temperature adjusting system, comprising:
a battery unit including a heating pad;
a leading wire connected to the battery unit; and
a current induction unit surrounding the leading wire,
wherein the current induction unit is electrically connected to the heating pad.

2. The battery temperature adjusting system of claim 1, wherein the battery temperature adjusting system comprises:
a motor unit:
a battery unit including a heating pad;
a leading wire connecting the motor unit and the battery unit; and
a current induction unit surrounding the leading wire,
wherein the current induction unit is electrically connected to the heating pad.

3. The battery temperature adjusting system of claim 1, wherein the battery unit comprises a plurality of cells and a plurality of heating pads.

4. The battery temperature adjusting system of claim 3, wherein the cell is a lithium secondary battery.

5. The battery temperature adjusting system of claim 1, wherein the battery unit is used as at least one power source for a middle- or large-sized device from among an electrically driven vehicle including an electric vehicle (EV), a hybrid electric vehicle (HEV) and a plug-in hybrid electric vehicle (PHEV); an electric truck; an electric commercial vehicle; and a power storage system.

6. The battery temperature adjusting system of claim 1, wherein the heating pad comprises a heating wire.

7. The battery temperature adjusting system of claim 1, wherein the current induction unit comprises a solenoid coil.

8. The battery temperature adjusting system of claim 7, wherein the solenoid coil is made of metal or metal alloy having a conductivity of $5.80\times10^6$ mhos/m or more.

9. The battery temperature adjusting system of claim 1, further comprising a control unit for controlling the temperature of the battery unit.

10. The battery temperature adjusting system of claim 9, wherein the control unit is a solid state relay switch unit.

11. The battery temperature adjusting system of claim 1, further comprising a device for increasing the temperature of the battery unit by using power of the battery itself.

12. The battery temperature adjusting system of claim 1, further comprising a device for increasing the temperature of the battery unit by using an extra power source.

13. A method for operating a battery temperature adjusting system, the method comprising:
 (a) charging and discharging a battery unit by generating a current in a leading wire connected to the battery unit having a heating pad, and generating a magnetic force around the leading wire;
 (b) generating an induced current in a current induction unit surrounding the leading wire through the magnetic force generated in operation (a); and
 (c) supplying the induced current generated in operation (b) to the heating pad.

14. The method for operating a battery temperature adjusting system of claim 13, wherein the method comprises:
 (a) charging and discharging the battery unit by generating an electric current in the leading wire connecting a motor unit and the battery unit having the heating pad, and generating a magnetic force around the leading wire;
 (b) generating an induced current inside the current induction unit which surrounds the leading wire through the magnetic force generated in operation (a); and
 (c) supplying the induced current generated in operation (b) to the heating pad.

15. The method for operating a battery temperature adjusting system of claim 13, further comprising cutting off the induced current supplied in operation (c) when the temperature of the battery unit is increased over a reference temperature.

* * * * *